Patented June 23, 1936

2,045,560

UNITED STATES PATENT OFFICE 2,045,560

PROCESS FOR CONVERSION OF ALCOHOLS TO ETHERS

Merrell Robert Fenske, Pennsylvania State College, Pa.

No Drawing. Application March 7, 1931, Serial No. 520,996

7 Claims. (Cl. 260—151)

This invention relates to an improved method of converting alcohols to ethers involving the use of a flow system operating at suitable temperatures and high pressures and with or without the use of catalysts.

The present prevailing methods for preparing ethers from alcohols consist, for the most part, in operating at substantially atmospheric pressure either in the liquid phase or solution or in the gaseous phase. In the first case the alcohols are treated in the liquid phase or in solution of mineral acids, for example, sulfuric, phosphoric or sulfonic acids. These reactions, for the most part, are carried out at temperatures below, say 200° C. In the second case, the operating temperatures are higher, namely 200 to 400° C., and various known dehydrating catalysts are used, as for example mineral acids or anhydrides as phosphoric anhydride, halogen acids, either alone or in combination with metals, various inorganic salts possessing an affinity for water, and various dehydrating metallic oxides, as for example alumina, thoria, tungstic oxide, molybdenum oxide, vanadium oxide, etc. In both these cases the reactions are carried out at substantially atmospheric pressure.

The first method has the disadvantage that the product is contaminated with various other reaction products. In the case of the sulfuric or sulfonic acids commonly used, there are sulfates, sulfur dioxide, and various organic sulfur compounds. In the second case or vapor phase reaction, the catalytic activity and temperature of operation must be carefully controlled to eliminate as far as possible wasteful side reactions. In this case the most common and predominate byproducts are olefines.

My invention constitutes a distinct advance in the art as consideration of the following points of advantage will demonstrate.

1. The reaction may be carried out with more rugged catalysts rather than those of exceptional activity, or even without catalysts other than the materials of the high pressure reactor.

2. The contamination of the product by impurities introduced in the existing processes by catalysts such as sulfuric or sulfonic acids is avoided.

3. The preparation of ethers higher than ethyl ether is made easier. Substantial yields of higher ethers are obtainable whereas in the ordinary preparations the yields are poor.

4. The preparation of ethers of secondary alcohols is made possible. These ethers are not readily obtainable by present processes.

5. Because of the elevated temperatures and the stabilizing effect of pressure on the side reactions, the speed of ether formation is greatly increased.

The following examples will serve to illustrate how the process is carried out, but it is understood that minor deviations can be made therefrom without departing from the scope of the invention.

1. *Ethyl ether.*—95% ethyl alcohol containing from 1–3 mols percent of ethyl bromide or phosphoric acid is passed at a rate of about 10 cubic centimeters per minute through a high pressure reactor of volume approximately 15 cubic centimeters at a temperature of 300–350° C. and pressures from 2000 to 4000 pounds per square inch. Over 50% of the alcohol undergoing decomposition is obtained as ethyl ether.

2. *Normal propyl ether.*—Normal propyl alcohol, pure or inaqueous solution, in the presence of small amounts of copper or aluminum bromide, or propyl bromide at temperatures from 250 to 310° C. and pressure from 1000 to 5000 pounds per square inch, gives substantial quantities of normal propyl ether. Over 80% of the alcohol which decomposes goes to ether, the balance essentially to propylene.

3. *Isopropyl ether.*—Using isopropyl alcohol under the same conditions as for normal propyl alcohol gives considerable amounts of isopropyl ether. The yields of ether are not as good as for normal propyl alcohol, from 25 to 50% of the alcohol decomposed going to ether, the balance to propylene.

4. *Normal butyl ether.*—Normal butyl alcohol, either pure or in aqueous solution, in the presence of small amounts of copper or aluminum bromide or butyl bromide, at temperatures from 250 to 350° C. and pressures from 1000 to 5000 pounds per square inch, gives normal butyl ether. About 75–85% of the butyl alcohol decomposing forms ether, the balance olefines.

The apparatus for carrying out the process herein described consists, in simplest form, (1) of a high pressure pump whereby the reacting materials are pumped to the desired operating pressure, (2) a high pressure reactor which is heated electrically or by gas to the reaction temperature which is measured by a calibrated thermocouple, (3) a condenser through which the reaction products are passed and in which the condensation occurs at substantially operating pressure and a reducing valve whereby the cooled reaction products are released from the high pressure to substantially atmospheric pressure.

The reactor may consist of (1) a rather large reaction chamber containing the solid catalysts or (2), a heated coil of high pressure tubing through which are passed the reacting materials and a catalyst in solution or dispersed in the reacting materials.

It should be understood that the process can be carried out in apparatus of a type different from that described, the invention not being dependent upon the apparatus used. To those skilled in the art different kinds of apparatus will suggest themselves as being suitable, the novelty of my discovery residing not in the apparatus but in the process.

What I claim as new is:

1. In the process of converting alcohols to ethers, the step which comprises subjecting the alcohols which contain non-oxidizing mineral acids as catalytic dehydrating materials, which catalysts are in the same phase as the alcohol, in a flow system to temperatures of about 250° C. to about 350° C., and to pressures of about 1000 to about 5000 pounds per square inch.

2. In the process of converting alcohols to ethers, the step which comprises subjecting the alcohols which contain as a catalyst an alkyl ester of a non-oxidizing mineral acid, which catalyst is in the same phase as the alcohol in a flow system to temperatures of about 250° C. to about 350° C., and to pressures of about 1000 to about 5000 pounds per square inch.

3. In the process of converting alcohols to ethers, the step which comprises subjecting the alcohols which contain a non-oxidizing halogen acid as a dehydrating catalyst in the same phase as the alcohols, in a flow system to temperatures of about 250° C. to about 350° C. and to pressures of about 1000 to about 5000 pounds per square inch.

4. In the process of converting alcohols to ethers, the step which comprises subjecting the alcohols which contain a halide dehydrating catalyst in the same phase as the alcohol, in a flow system to temperatures of about 250° C. to about 350° C. and to pressures of about 1000 to about 5000 pounds per square inch.

5. In the process of converting ethyl alcohol to ethyl ether, the step which comprises subjecting ethyl alcohol containing a catalytic dehydrating material in the same phase as the alcohol, which catalyst contains the acid radical of a non-oxidizing mineral acid, in a flow system to temperatures of about 300° C. to about 350° C. and to pressures of about 1000 to about 5000 pounds per square inch.

6. In the process of converting isopropyl alcohol to isopropyl ether, the step which comprises subjecting isopropyl alcohol containing a catalytic dehydrating material in the same phase as the alcohol, which catalyst contains the acid radical of a non-oxidizing mineral acid, in a flow system to temperatures of about 250° C. to about 310° C. and to pressures of about 1000 to about 5000 pounds per square inch.

7. In the process of converting normal propyl alcohol to normal propyl ether, the step which comprises subjecting normal propyl alcohol containing a catalytic dehydrating material in the same phase as the alcohol, which catalyst contains the acid radical of a non-oxidizing mineral acid, in a flow system to temperatures of about 250° C. to about 310° C. and to pressures of about 1000 to about 5000 pounds per square inch.

MERRELL ROBERT FENSKE.